United States Patent
Wein

[19]

[11] Patent Number: 5,880,430
[45] Date of Patent: Mar. 9, 1999

[54] METHOD AND APPARATUS FOR LASER ENGRAVING

[76] Inventor: Joseph H. Wein, 1550 W. Carroll Ave., Chicago, Ill. 60607-1012

[21] Appl. No.: 514,257

[22] Filed: Aug. 11, 1995

[51] Int. Cl.$^6$ .................................................. B23K 26/00
[52] U.S. Cl. ....................................................... 219/121.69
[58] Field of Search ........................ 219/121.68, 121.69, 219/121.61; 364/474.08; 347/224, 232, 247

[56] References Cited

U.S. PATENT DOCUMENTS

| | | | |
|---|---|---|---|
| 4,240,119 | 12/1980 | Norton et al. | 358/297 |
| 4,465,919 | 8/1984 | Roder | 219/121.82 |
| 4,564,737 | 1/1986 | Burke et al. | 219/121.68 |
| 4,970,600 | 11/1990 | Garnier et al. | 219/121.69 |
| 5,478,426 | 12/1995 | Wiler et al. | 219/121.67 |
| 5,509,091 | 4/1996 | Aoki | 382/298 |
| 5,660,668 | 8/1997 | Matheson et al. | 219/121.68 |

FOREIGN PATENT DOCUMENTS

| | | |
|---|---|---|
| 3935423 | 4/1994 | Germany . |
| 4235302 | 4/1994 | Germany . |
| 1-214480 | 8/1989 | Japan . |
| 7-167968 | 7/1995 | Japan . |
| 8301696 | 5/1983 | WIPO . |

*Primary Examiner*—Geoffrey S. Evans
*Attorney, Agent, or Firm*—Wallenstein & Wagner, Ltd.

[57] ABSTRACT

A method for computer laser etching a design into a workpiece where the design is laser etched into the workpiece with the aid of a computer and computer peripherals, a laser etching device, and a control program which controls the laser beam. The workpiece may include a surface upon which a single layer or multiple layers of oxidizable coating material, such as paint, has been applied. The method is performed by the following steps: the design is input into the computer memory by use of a scanner or other input device; the design may then be scaled to a desired size; the intensity of the laser beam is selected so that only a single layer of material is removed; and the control program directs the laser beam to etch away appropriate portions of the layer of ablatable material, thus exposing the underlying surface and forming the desired design. Multiple color or multiple layer designs may be formed in a like manner where the laser beam is controlled by the control program to remove different portions of each layer to create a multi-colored or multi-layered design. The workpiece may consist of a molding form where the laser etches a three dimensional pattern into it to create a cavity which is subsequently filled with molten material for casting an object, by the steps of: inputting a design into the computer memory; scaling the design to the appropriate size; selecting the proper intensity for the laser beam so that the design is etched into the workpiece at the proper depth; controlling the motion of the laser beam with the control program so that the design is etched into the surface.

13 Claims, 2 Drawing Sheets

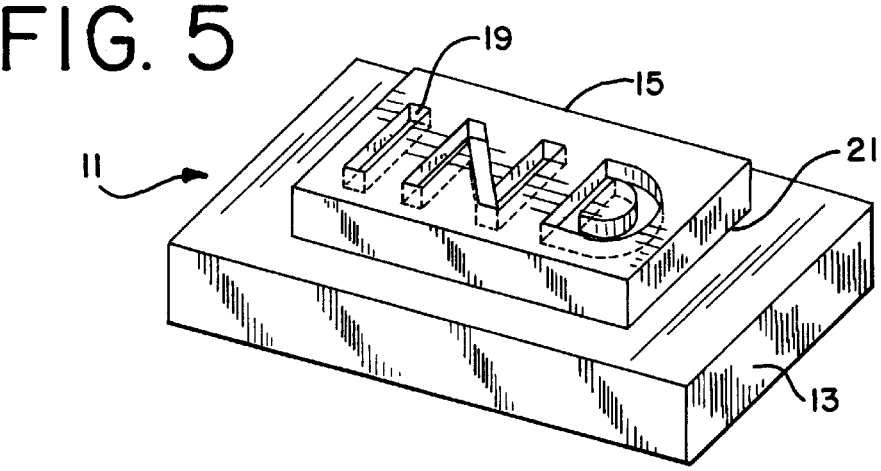
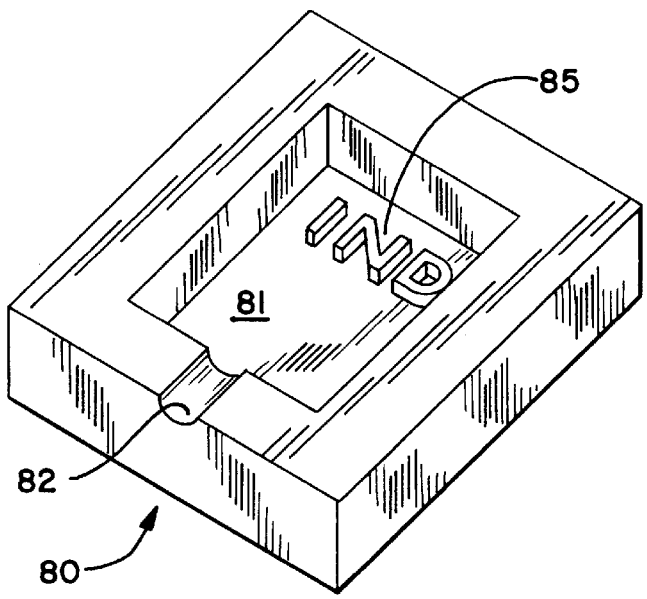
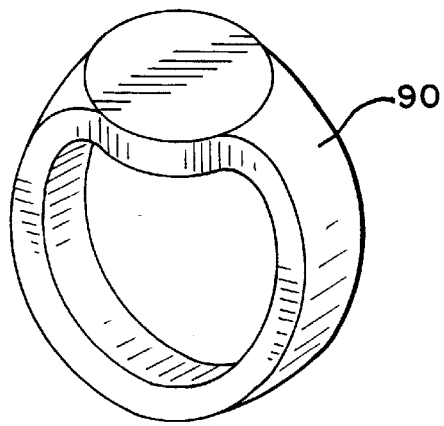
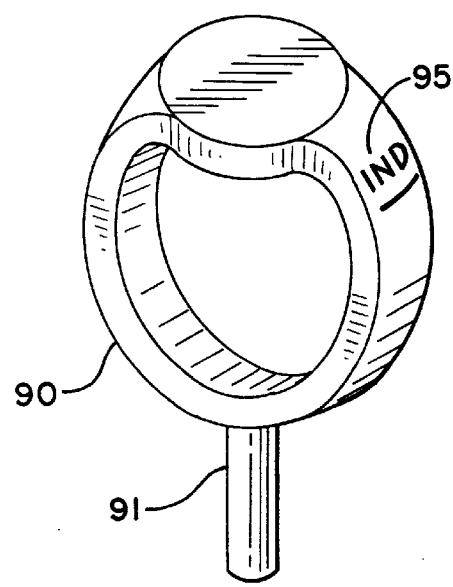

METHOD AND APPARATUS FOR LASER ENGRAVING

BACKGROUND OF THE INVENTION

The present invention relates to a method and apparatus for laser engraving. This invention includes the process of creating casting waxes by laser engraving a three dimensional pattern into the wax itself, or into the rubber used to form the wax.

In the prior art for lost wax casting, numerous methods are also known for creating the waxes used in this well-known process. Most commonly, molding forms, commonly referred to as rubbers, are used to create the waxes by injecting molten wax into a void contained within the rubber. The rubbers are themselves created by forming them around a model made of a material such as silver that has been machined or hand-carved into the desired design. Waxes carved directly by hand are also known in the art. Throughout this document, all references to rubbers are intended to refer to molding forms used in lost-wax casting, rather than referring to the material rubber.

Regardless of the method used to create the waxes, the lost wax process encases the waxes in a plaster "investment" which hardens. The investment is placed in a furnace where the wax burns out, leaving a female cavity where the wax had been. Molten metal is then poured into the female cavity of the investment. When the molten metal cools, the investment is broken to remove the casting.

The known methods of creating the waxes for casting have several drawbacks. One problem with the known methods is the level of artistic or mechanical skill required. Machining a model used to create a rubber requires a high degree of specialized machining skills and a considerable amount of time. Hand carving a wax requires the same artistic skill and considerable time. In addition, a wax carved directly, permits the manufacture of a single unique piece, with no repeatability possible. Due to the time and skill required to create models or carved waxes, it is quite costly. While the cost of the model may be slight when distributed among a large production of identical castings, this cost is substantial for a single unique casting or for a smaller run. Therefore, unique or personalized products are unattractive to the consumer due to the prohibitive costs associated with their development. However, a market would exist for such items if the costs could be reduced to be more in line with the per piece costs associated with large runs.

Consequently, there is presently a need for a method of creating a molding form, such as a rubber or wax, which will solve the above problems. Specifically, there is a need for a method of making waxes quickly and efficiently which: (1) does not require highly specialized artistic or machining skills and (2) is cost efficient for a small item or single run items.

SUMMARY OF THE INVENTION

The present invention is characterized by a method of computer generated laser engraving a design into a workpiece and a combination of apparatus and workpiece for achieving such a method. Generally, a design is laser etched into the workpiece with the aid of a computer and computer peripherals, a laser engraving device, and a control program which controls the laser beam. The workpiece may also consist of a wax used in lost wax casting such that the laser engraves a design into the wax. The workpiece may also consist of a rubber into which a design is engraved by the laser. The waxes produced from such a rubber would have the design contained within their form.

When the disclosed method of laser engraving is used to create a casting wax, the laser engraving takes the place of costly machining operations or hand carving and permits efficient manufacture of personalized and unique products. Briefly, for this type of workpiece, an input design is input into the computer memory, certain parameters such as size of the engraving may be modified, if desired, and the proper intensity of the laser beam is selected so that the design engraved into the wax is of the proper depth; the control program controls the operation of the laser beam and the design is engraved into the wax.

When the disclosed method of laser engraving is used to create a rubber to be subsequently used to produce a wax for lost wax casting, the laser engraving takes the place of costly machining or hand carving of a model. this technique will result in the possibility of mass production, but without the initial investment of very costly hand model making. This technique will require that the pattern to be engraved must be a "female" pattern to result in the "male" wax pattern.

OBJECTS OF THE INVENTION

It is the principal object of the present invention to provide the method of laser engraving of the character referred to.

One object of the present invention is to furnish a method for applying a design onto a surface of a workpiece by laser engraving which is inexpensive enough so that a single run of a personalized design is cost efficient enough to be competitive with mass produced designs.

Another object is to apply a design to the surface of a workpiece wherein the design has been input into a computer memory through use of an image scanner.

Another object of the present invention is to produce a method of creating a casting wax by laser engraving which does not require specialized artistic or machining skill and which may be performed by an operator with a minimal amount of training, and is inexpensive enough so that single runs of personalized designs are cost efficient enough to be competitive with mass produced designs.

Yet another object of the present invention is to furnish a method of creating a molding rubber by laser engraving which does not require specialized artistic or machining skills necessary to create a model from which a rubber is created.

Still another object is to provide a method of creating the above waxes and rubbers which may be performed by an operator with a minimal amount of training.

Still another object is to provide a combination of components that will facilitate the above objects of the present invention for furnishing the described methods.

These and other objects and features of the present invention are discussed or apparent in the following detailed description.

BRIEF DESCRIPTION OF THE DRAWINGS

A preferred embodiment of the present invention is described herein with reference to the drawings wherein:

FIG. 5 is a perspective view of a primary molding form of a first material combined with a layer of a second material impervious to laser engraving, with the letters "IND" engraved therein;

FIG. 6 is a perspective view of a rubber laser engraved with "IND" which may be used to form a wax;

FIG. 7 is a perspective view of a wax for a jewelry piece, such as a ring; and

FIG. 8 is a perspective view of the wax for a workpiece, such as a ring, engraved directly by laser etching according to the present invention.

DETAILED DESCRIPTION OF PREFERRED EMBODIMENTS

Figure 1:
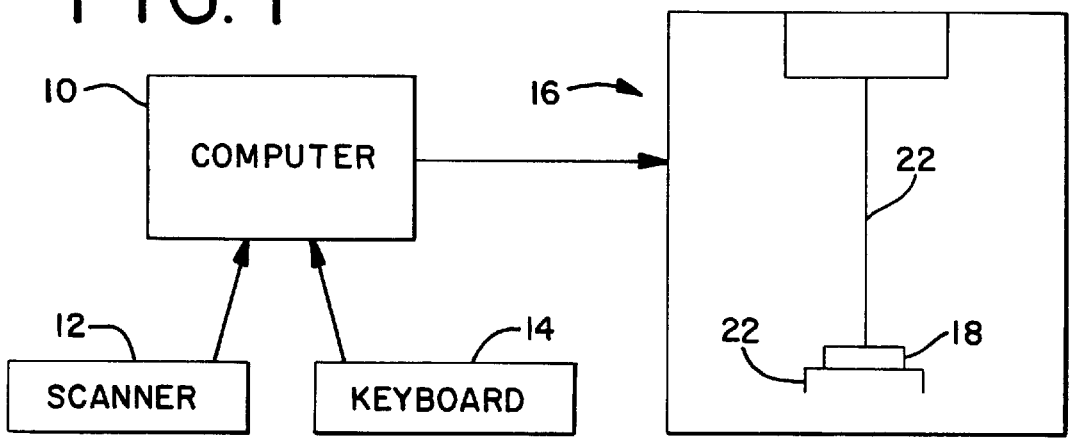
FIG. 1 is a schematic of the major components utilized in performing the invention.

FIG. 1 schematically illustrates the equipment used to accomplish the steps of the present invention, and FIGS. 2–9 illustrating workpieces made according to preferred embodiments of the present invention, indicating steps in the method of laser etching according to the present invention.

As shown in FIG. 1, a schematic of the principal components utilized to perform the claimed method, a design is input into the memory of a computer 10 through either a scanner 12, a keyboard 14, or both, or other input device known to those skilled in the art. Next, the computer 10 communicates the design to the laser engraving device 16, which engraves the design onto workpiece 18 by use of laser beam 20.

The computer 10 may be a typical personal computer, such as an IBM 486, or the like, which has been programmed with a laser control program. One example of such laser control program is LUMONICS SOLO user interface software which is available with a LUMONICS LIGHT-WRITER SPE laser engraving device. It should be understood, of course, that other brands and models of control software, engraving devices, etc. will perform the method of the claimed invention equally well, and that the brands and models discussed are by way of example only and not to be taken as limitations upon the claimed invention.

To perform the method of engraving, an operator enters an input design into the memory of computer 10. The input design may be entered into the memory of computer 10 by scanning an image into scanner 12 or by typing, or both, or otherwise inputting, an image into the computer 10 via the keyboard 14. The operator may then modify the input design in a variety of ways. The operator may scale the input design by conventional, well-known techniques such that the size of the entire design is made larger or smaller or such that only specific elements of the design are made larger or smaller, or multiple images may be combined in whole or part.

The workpiece 18 is then placed in the laser engraving device 18 upon a seat 22. The intensity of the laser beam is adjusted so that an etching of the proper depth is made by the beam. The laser beam 20 is controlled by the computer 10 to engrave an output design into the workpiece. The output design corresponds to the input design and includes any modifications made in the sizing or arrangement.

The depth of the material removed by the laser is controlled by varying the intensity of the laser beam. If only one thin layer is to be removed, the beam should be set to a low intensity. Removal of a thicker layer of material would require an increase in the intensity of the beam. Because the intensity levels and settings required for each particular laser beam will be different, specific settings are not disclosed herein. However, one skilled in the art would learn or know the proper settings for his/her particular laser beam. The level of intensity is approximately proportional to the thickness of the material removed.

Figure 2:
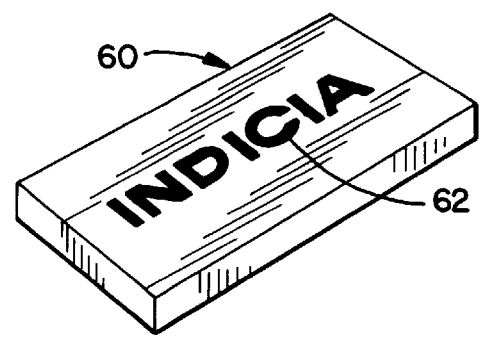
FIG. 2 is a perspective view of the word "INDICIA" etched into a mold.
Figure 3:
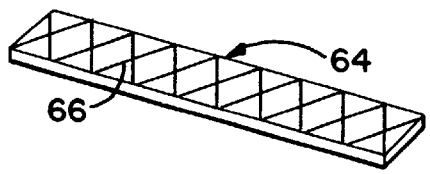
FIG. 3 is a perspective view of a design etched into a flat molding form.
Figure 4:
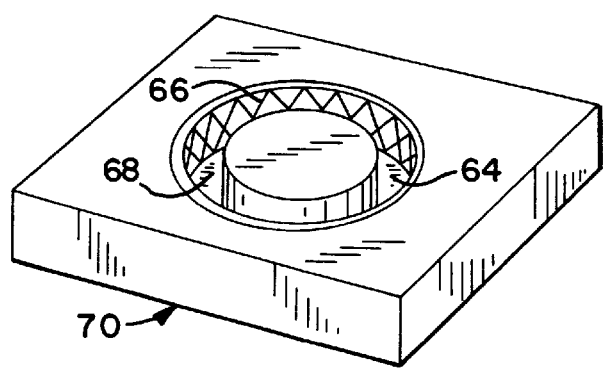
FIG. 4 is a perspective view of the flat molding form of FIG. 9 incorporated into a primary molding form.

A method of creating a rubber may be accomplished by using the present invention to provide the structures shown in FIGS. 2–4. FIG. 2 shows a rubber 60 with the stylized word "INDICIA" etched into it designated by reference number 62. The rubber 60 may be, for example, the form used to mold a person's name out of gold or silver to create a pendant which hangs on a chain. Of course, other types of jewelry items may also be formed equally well. The piece of jewelry may be cast from a wax created by the rubber.

Briefly, the rubber 60 is first laser etched with the design 62 using the method disclosed above, i.e. the input pattern of the word "INDICIA" is input into the computer memory, the image is then scaled, the intensity of the laser beam is adjusted to achieve the desired depth, and then the laser, controlled by the control program, engraves the design into the molding form as an output pattern. Next, the wax is injected or poured into the cavity formed by design 62. Finally, the completed wax is removed from the molding form 60, and cast using lost-wax casting techniques. The single wax form or a number of wax forms connected by a "tree" are then covered with plaster of paris to form a mold. The metal or other material desired to be molded is then introduced, in a molten form, into the plaster of paris mold. The molten metal replaces the wax forms and creates, by casting, the final metal molded object, such as the stylized "INDICIA" 62.

The disclosed etching method may also be utilized for an insert which is added to a primary rubber to provide a three dimensional object such as a ring or other piece of jewelry, as explained below with reference to FIGS. 3 and 4. In FIG. 3, a flat insert 64 is shown. Upon the insert 64 a design 66 has been engraved by the laser engraving method described above. The flat insert is wrapped into an annular shape, as shown in FIG. 4, and then placed into an annular channel 68 in the primary rubber 70. The primary rubber 70 may be utilized to directly mold metal rings or may be used to mold wax forms for use in the lost wax process briefly described above. A ring molded from primary mold 70 will have design 66 etched onto its outer surface.

Referring to FIG. 5, an additional manner in which the method of the invention may be performed is illustrated, by using a molding form 11 made from two different materials—a first material base 13 with a low propensity to being engraved by laser and a body of a second material 15 with a high propensity to being engraved by laser. The base 13 is made from the first material, i.e. the material that is not easily engravable by laser. The second material 15 is positioned over the base 13 and the process of engraving is performed as described above to engrave a design, such as the word "IND(ICIA)" 19, into the second material. The laser will only etch the design 19 into the second material 15 until it reaches the interface 21 between the two different materials.

In this manner described above, the depth of the laser engraving may be precisely controlled by controlling the depth of the channel instead of varying the intensity of the laser beam. Use of this two-material molding form allows a relatively unskilled operator of the laser etching device to produce etchings of the proper depth easily and without any experimentation with varying of the laser intensity.

In FIG. 6, a rubber 80 is provided, having a cavity 81 into which wax may be injected; and a sprue channel 82 is connected to the cavity. The cavity 81 of the rubber 80 may be laser engraved by the present process with the marking 85 of the word "IND(icia)" as shown, so that it forms a permanent part of the pattern for the wax.

As illustrated in FIGS. 7 and 8, the wax 90 may be conventionally carved by hand sculpturing or machining methods, and a stem 91, as shown in FIG. 8, may be connected to the wax. In this embodiment, as shown in FIG. 8, the wax 90 is directly engraved by the laser etching process described by a marking 95 of the "INDIC(ia)" directly into the wax.

With reference to the disclosures discussed concerning FIGS. 2, 4, 5, and 6, the rubber is preferably a two-piece mold, and molten wax is injected into it through a nipple. After the wax hardens, the mold is separated and the wax is removed.

For clarity and consistency in the terminology of the claims, a "molding form," "rubber," and "molding rubber" are referred to as a "molding form." A "wax," and "casting wax" are referred to as an "ablatable object." And, an "investment" is referred to as a "mold." Accordingly, in the lost wax process a molding form (generally a negative-image object) is used to make the ablatable object (generally a positive-image object); the ablatable object is used to make the mold (generally a negative-image object); and, the mold is used to make the end product (generally a positive-image object).

The preferred embodiments of the present invention have been described herein. It is to be understood, of course, that changes and modifications may be made in the embodiments without departing from the scope and spirit of the present invention as defined by the appended claims.

I claim:

1. A method of creating a design upon a workpiece, comprising the steps of:
    (a) providing a molding form defined by a thickness dimension;
    (b) inputting an input design to be engraved into a memory of a computer, said input design being defined by a set of input dimensions;
    (c) adjusting the input dimensions of said input design to a selected size;
    (d) communicating said input design of said selected size from said memory of said computer to a laser engraving device having an intensity suitable for ablating said molding form;
    (e) controlling said laser beam of said laser engraving device with a control program input into said computer;
    (f) engraving an output design into said molding form according to said input design by causing said laser beam to ablate a portion of said thickness dimension with said output design being defined by said output dimensions;
    (g) employing said molding form to form an ablatable object;
    (h) employing said ablatable object to form a mold; and,
    (i) creating said design upon said workpiece from said mold.

2. The method of claim 1, with the additional step of adjusting the intensity of said laser beam to correspond with a desired depth of said design.

3. The method of claim 1, wherein said workpiece comprises a molding form having a cavity, and said laser beam laser engraves a marking into said cavity.

4. The method of claim 1, wherein said workpiece comprises a sculptured body, and said laser beam laser engraves a marking onto said body.

5. The method of engraving a workpiece according to claim 1, wherein said workpiece is the molding form used in a lost wax casting.

6. A method of creating a workpiece comprising the steps of:
    (a) inputting an input pattern defined by a set of dimensions including first thickness dimensions and first planar dimensions normal to said first thickness dimensions;
    (b) communicating said input pattern from said memory of said computer to a laser engraving device having a laser beam;
    (c) controlling said laser beam of said laser engraving device with a control program input into said computer;
    (d) engraving an output pattern according to said input pattern into a surface of a form with said laser beam; and,
    (e) using said form as either a molding form or as an ablatable object in a lost wax casting process to create a workpiece.

7. A method of creating a workpiece according to claim 6, wherein said form comprises a molding form and said laser beam has an intensity and said control program controls the intensity of said laser beam such that said intensity is varied proportionally to said first thickness dimensions of said input pattern and a second thickness dimensions of said output pattern is engraved into said molding form corresponding to said first thickness dimensions of said input pattern.

8. A method of creating a workpiece according to claim 7, wherein said control program controls displacement of said laser beam such that a second planar dimensions of said output pattern is engraved into said molding form corresponding to said first planar dimensions of said input pattern.

9. A method of creating a workpiece according to claim 6, wherein said first planar dimensions may be proportionally scaled within said control program such that a second planar dimension of said output pattern is engraved into said molding form proportionally scaled with respect to said first planar dimensions of said input pattern.

10. A method of creating a workpiece according to claim 6, and further including the steps of:
    (e) forming a circle with said molding form; and
    (f) placing said circle made by said flat molding form into a circular channel of a primary molding form.

11. The method of casting a molding form according to claim 6, wherein said form is used to create an ablatable object for lost wax casting.

12. The method of engraving a workpiece according to claim 6, wherein said workpiece is the molding form used in a lost wax casting.

13. A method of creating a design upon a workpiece, comprising the steps of:
    (a) providing an ablatable object defined by a thickness dimension;
    (b) inputting an input design to be engraved into a memory of a computer, said input design being defined by a set of input dimensions;
    (c) adjusting the input dimensions of said input design to a selected size;
    (d) communicating said input design of said selected size from said memory of said computer to a laser engraving device having an intensity suitable for ablating said ablatable object;
    (e) controlling said laser beam of said laser engraving device with a control program input into said computer;

(f) engraving an output design into said ablatable object according to said input design by causing said laser beam to ablate a portion of said thickness dimension with said output design being defined by said output dimensions;

(g) employing said ablatable object to form a mold; and, (h) creating said design upon said workpiece from said mold.

* * * * *